(12) United States Patent
Wang (10) Patent No.: US 10,560,547 B2
(45) Date of Patent: Feb. 11, 2020

(54) COMMUNICATION APPARATUS AND RELAY PROTECTION APPARATUS

(71) Applicant: Shaogang Wang, Shanghai (CN)

(72) Inventor: Shaogang Wang, Shanghai (CN)

(73) Assignee: Schneider Electric Industries SAS, Rueil-Malmaison (FR)

(*) Notice: Subject to any disclaimer, the term of this patent is extended or adjusted under 35 U.S.C. 154(b) by 252 days.

(21) Appl. No.: 15/027,858

(22) PCT Filed: Oct. 9, 2014

(86) PCT No.: PCT/CN2014/088208
§ 371 (c)(1),
(2) Date: Apr. 7, 2016

(87) PCT Pub. No.: WO2015/051748
PCT Pub. Date: Apr. 16, 2015

(65) Prior Publication Data
US 2016/0261706 A1    Sep. 8, 2016

(30) Foreign Application Priority Data

Oct. 10, 2013  (CN) .......................... 2013 1 0470443

(51) Int. Cl.
*H04L 29/08* (2006.01)
*H04L 12/24* (2006.01)
*H04L 29/06* (2006.01)

(52) U.S. Cl.
CPC .......... *H04L 67/303* (2013.01); *H04L 41/046* (2013.01); *H04L 69/08* (2013.01)

(58) Field of Classification Search
None
See application file for complete search history.

(56) References Cited

U.S. PATENT DOCUMENTS 5,828,901 A * 10/1998 O'Toole ................. G06F 13/28
                                                                  710/22
2003/0157938 A1* 8/2003 Haase ..................... H04W 8/18
                                                                  455/445
(Continued)

FOREIGN PATENT DOCUMENTS

CN    101159452 A    4/2008
CN    101350986 A    1/2009
(Continued)

OTHER PUBLICATIONS

Abb et al. IEC 60870-5-103 Communication Protocol—2011.*
Schneider et al. Multifuncitona Numerical Relay (IED) product portfolio—May 2012.*
"IEEE Trial—Use Recommended Practice for Data Communications Between Intelligent Electronic Devices and Remote Terminal Units in a Substation", Institute of Electrical and Electronics Engineers (IEEE) Std. 1379-1997, Published 1997, 64 pages.
(Continued)

*Primary Examiner* — Younes Naji
(74) *Attorney, Agent, or Firm* — Locke Lord LLP (57) ABSTRACT

Provided is a communication apparatus and a relay protection apparatus, the communication apparatus supports at least one of communication protocols and provides functions of at least two dedicated communication profile components for each of the communication protocols, and the communication apparatus comprises: a configuration module for setting an operational parameter of the communication apparatus, wherein the operational parameter indicates that which one of the at least two dedicated communication profile components is used for the communication apparatus; a management module for causing the communication apparatus to operate as the one of the at least two dedicated communication profile components according to the configuration of the configuration module; and a communication function module for providing the functions of the at least two dedicated communication profile components, wherein the management module causes the communication apparatus to operate as the one of the at least two dedicated communication profile components by selecting the function (Continued)

provided by the communication function module according to the configuration of the configuration module.

15 Claims, 3 Drawing Sheets

(56) References Cited

U.S. PATENT DOCUMENTS

| | | | |
|---|---|---|---|
| 2009/0048044 A1* | 2/2009 | Oleson | A63B 24/0062 473/570 |
| 2012/0185185 A1* | 7/2012 | Bae | H04Q 9/00 702/58 |
| 2012/0239170 A1 | 9/2012 | Kulathu et al. | |
| 2014/0098706 A1* | 4/2014 | Maruyama | H04J 3/0638 370/254 |
| 2014/0159740 A1* | 6/2014 | Schuster | H02H 7/261 324/522 |
| 2014/0211604 A1* | 7/2014 | Sandick | H04L 43/0811 370/216 |
| 2015/0052226 A1* | 2/2015 | Rude | G07C 5/008 709/219 |

FOREIGN PATENT DOCUMENTS

| | | | |
|---|---|---|---|
| CN | 101499639 | A | 8/2009 |
| CN | 101500104 | A | 8/2009 |
| CN | 201365108 | Y | 12/2009 |
| CN | 101673107 | A | 3/2010 |
| CN | 101854709 | A | 10/2010 |
| CN | 103268274 | | 8/2013 |
| EP | 1976218 | | 10/2008 |
| EP | 2189900 | | 5/2010 |

OTHER PUBLICATIONS

Extended European Search Report for European Patent Application No. 14852000.0, dated Mar. 16, 2017, 9 pages.
English Language Machine Translation of Chinese Patent Application Publication No. CN101499639A, 11 pages.
English Language Machine Translation of Chinese Patent Application Publication No. CN201365108Y, 11 pages.
English Language Machine Translation of Chinese Patent Application Publication No. CN101673107A, 15 pages.
English Language Machine Translation of Chinese Patent Application Publication No. CN101159452A, 18 pages.
English Language Machine Translation of Chinese Patent Application Publication No. CN101500104A, 9 pages.
English Language Machine Translation of Chinese Patent Application Publication No. CN101854709A, 19 pages.
English Language Machine Translation of Chinese Patent Application Publication No. CN101350986A, 11 pages.
International Search Report for International Application No. PCT/CN2014/088208, dated Jan. 12, 2015, 3 pages.
English Language Machine Translation of Chinese Patent Application Publication No. CN103268274, published Aug. 28, 2013, 14 pages.
Chinese Office Action dated Jul. 3, 2017 for Chinese Patent Application No. 201310470443.2, 6 pages.
English Language Translation of Chinese Office Action dated Jul. 3, 2017 for Chinese Patent Application No. 201310470443.2, 5 pages.
EP Examination Report for European Patent Application No. 14852000.0 dated Aug. 23, 2018, 5 pages.

* cited by examiner

COMMUNICATION APPARATUS AND RELAY PROTECTION APPARATUS

TECHNICAL FIELD

The present disclosure relates to a field of industry communication technology, and more particularly to a communication apparatus and a relay protection apparatus, which are capable of supporting at least one of communication protocols, and the communication apparatus can provide functions of at least two dedicated communication profile components for each of the communication protocols.

BACKGROUND

Currently, various communication profile component products applicable in an industrial automation, a substation automation or an intelligent protection exist in the market, such as a MiCom Px20, a MiCom Px30, a MiCom Px40, a Sepam 20/40/80, a Vamp 50, etc. These existing communication profile component products can support communication protocols including Modbus, DNP3 and IEC 103.

With developments in the technique, these existing communication profile component products may be replaced by other new communication profile component products gradually, however, the existing communication profile component products, which have been applied to an industrial field or the substation, could not be replaced by new communication profile component products directly because each of the communication profile component products might be different in their message types, message structures and the like.

For manufacturers of the communication profile component products, they still have to continue to produce legacy communication profile component products in order to ensure the industrial field or substation equipped with the legacy communication profile component products to operate normally although the legacy communication profile component products have been replaced by the new communication profile component products in the market gradually, which may cause an increasing of production cost for the manufacturers. On the other hand, for users of the communication profile component products, they have to continue to purchase the legacy communication profile component products equipped in the industrial field or substation in order to ensure the industrial field or substation to operate normally although the legacy communication profile component products have been replaced by the new communication profile component products in the market gradually, which may also cause an increasing of operating cost for the users.

Therefore, there is needed a communication profile component capable of supporting functions of various legacy communication profile component products and replacing the various legacy communication profile component products directly.

SUMMARY

In order to settle the above technique problems, the present disclosure provides a communication apparatus and a relay protection apparatus, which are capable of supporting at least one of communication protocols, and the communication apparatus can provide functions of at least two existing dedicated communication profile components for each of the communication protocols. By configuring the dedicated communication profile components operated currently for each communication protocol, the communication apparatus can provide the functions of dedicated communication profile components as being selected.

Further, the communication profile components are divided into common profile components and specific profile components according to features of the functions of at least two existing dedicated communication profile components in the communication apparatus, so that redundancy of the codes in the communication apparatus can be decreased, and work load and maintenance load of the communication apparatus can also be reduced.

According to an aspect of the present disclosure, there is provided a communication apparatus supporting at least one of communication protocols and providing functions of at least two dedicated communication profile components for each of the communication protocols, the communication apparatus comprises: a configuration module for setting an operational parameter of the communication apparatus, wherein the operational parameter indicates which one of the at least two dedicated communication profile components is used for the communication apparatus; a management module for causing the communication apparatus to operate as the one of the at least two dedicated communication profile components according to the configuration of the configuration module; and a communication function module for providing the functions of the at least two dedicated communication profile components, wherein the management module causes the communication apparatus to operate as the one of the at least two dedicated communication profile components by selecting the function provided by the communication function module according to the configuration of the configuration module.

In an example, for each of the communication protocols, the communication function module comprises: a common profile component for performing operations common to the plurality of the dedicated communication profile components; and a specific profile component for performing operations dedicated to each of the plurality of the dedicated communication profile components respectively.

In an example, for each of the communication protocols, the specific profile component comprises at least two specific sub-profile components each for performing the dedicated operations of each of the at least two dedicated communication profile components respectively.

In an example, the at least one communication protocol may comprise at least one of a Modbus protocol, a DNP3 protocol and an ICE 60870-5-103 protocol.

In an example, for each of the communication protocols, the at least two dedicated communication profile components may comprise at least two of a MiCom Px20 communication profile component, a MiCom Px30 communication profile component, a MiCom Px40 communication profile component, a Sepam 20/40/80 communication profile component and a Vamp 50 communication profile component.

According to another aspect of the present disclosure, there is further provided a relay protection apparatus comprising the communication apparatus described above.

The communication apparatus according to the present disclosure can support at least one communication protocol, and can be configured to provide the functions of any one of the at least two dedicated communication profile components for each of the communication protocols, and therefore the communication apparatus can be utilized to replace any one of existing various dedicated communication profile components.

Additional aspects and advantages of the present disclosure will be set forth in the description which follows and, in part, will be apparent from the description, or may be learned by practicing the invention. Objects and other advantages of the present disclosure may be implemented and acquired from structures stated specially in the specification, claims and drawings.

BRIEF DESCRIPTION OF THE DRAWINGS

The accompanying drawings are provided to assist in further understanding of the present disclosure and form a part of the specification, which are used to illustrate the present disclosure together with embodiments of the present disclosure but does not limit the present disclosure, wherein.

DETAILED DESCRIPTION

Various embodiments of the present disclosure will be described in detail in connection with drawings. Herein, it should be noted that components with substantively same or similar structure and function are denoted as same reference signs in the drawings and their repeated descriptions will be omitted herein.

Figure 1:
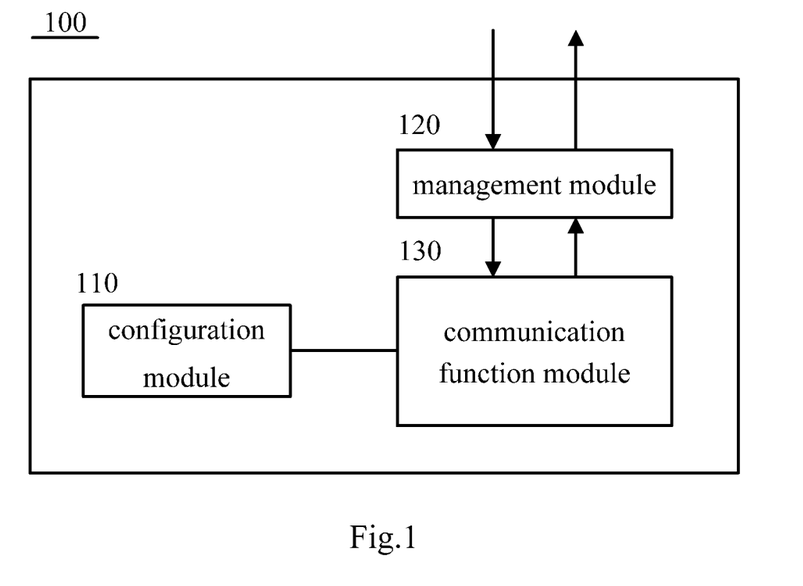
FIG. 1 illustrates an exemplary block diagram of a communication apparatus according to the embodiments of the present disclosure.

FIG. 1 illustrates an exemplary block diagram of a communication apparatus 100 according to the embodiments of the present disclosure. The communication apparatus 100 according to the embodiments of the present disclosure can support at least one of communication protocols, for example, a Modbus protocol, a DNP3 protocol and an IEC 60870-5-103 protocol. For each of the communication protocols, the communication apparatus 100 according to the embodiments of the present disclosure can provide functions of at least two dedicated communication profile components. The at least two dedicated communication profile components may be existing dedicated communication profile components, for example, a MiCom Px20, a MiCom Px30, a MiCom Px40, a Sepam 20/40/80 and a Vamp 50, or may also be any other dedicated communication profile components developed in future.

As illustrated in FIG. 1, the communication apparatus 100 according to the embodiments of the present disclosure may comprise a configuration module 110, a management module 120 and a communication function module 130.

The configuration module 110 sets an operational parameter of the communication apparatus 100, and the operational parameter indicates which one of the at least two dedicated communication profile components is used for the communication apparatus.

The management module 120 makes the communication apparatus 100 operate in one of the at least two dedicated communication profile components according to the configuration of the configuration module 110.

The communication function module 130 provides functions of the at least two dedicated communication profile components.

The management module 120 makes the communication apparatus 100 operate in one of the at least two dedicated communication profile components by selecting the function provided by the communication profile component according to the configuration of the configuration module.

When configuration parameters in the configuration module 110 are set in use, for example, when the configuration parameters in the configuration module 110 are set to indicate that the communication apparatus 100 operates in a Px20 dedicated communication profile component, the configuration module 110 may set operation parameters, for example, measurement parameters to be measured, a message timeout interval parameter and the like, corresponding to the Px20 dedicated communication profile component accordingly.

In usage, the configuration of the configuration module 110 may be implemented by dedicated configuration tools, may also be implemented by configuration software installed in a general purpose computer, or may be implemented by a configuration button arranged in the communication apparatus 100. It should be understood that the present disclosure is not limited to any detailed configuration manner, and those skilled in the art can design various configuration manners depending on actual application situations.

After the configuration of the configuration module 110 is completed, the management module 120 identifies which dedicated communication profile component is used for the communication apparatus 100 currently according to the configuration of the configuration module 110. When the configuration module 110 configures the operational parameters corresponding to the Px20 dedicated communication profile component, the management module 120 configures the communication function module 130 to perform the functions of the Px20 dedicated communication profile component and initializes the communication function module 130.

Figure 2:
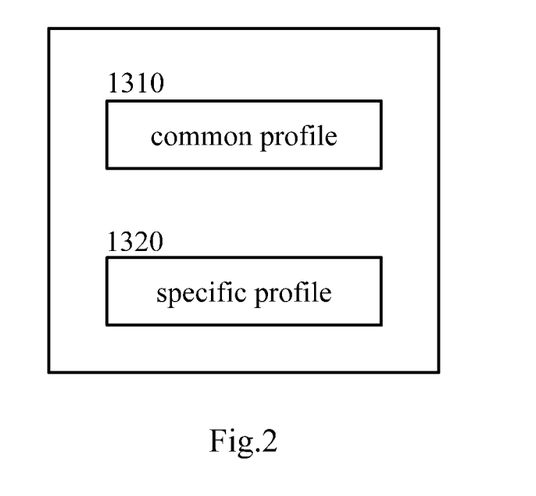
FIG. 2 illustrates an internal block diagram of a communication function module in the communication apparatus according to the embodiments of the present disclosure.

FIG. 2 illustrates an internal block diagram of the communication function module 130 in the communication apparatus 100 according to the embodiments of the present disclosure.

As illustrated in FIG. 2, the communication function module 130 may comprise a common profile component 1310 and a specific profile component 1320.

The common profile component 1310 is configured to perform operations common to a plurality of the dedicated communication profile components. The specific profile component 1320 is configured to perform operations dedicated to each of the plurality of the dedicated communication profile components respectively. Furthermore, the specific profile component 1320 may comprise at least two specific sub-profile components each for performing the operation dedicated to each of the at least two dedicated communication profile components respectively. For example, the specific profile component 1320 may comprise 7 specific sub-profile components, such as a MiCom Px20 sub-profile component, a MiCom Px30 sub-profile component, a MiCom Px40 sub-profile component, a Sepam 20 sub-profile component, a Sepam 40 sub-profile component, a Sepam 80 sub-profile component and a Vamp 50 sub-profile component. It should be understood that it is not limited that the embodiments of the present disclosure must include the above 7 specific sub-profile components, but may comprise any number of any specific sub-profile components of the dedicated communication profile components supporting same communication protocol.

Further, it should be noted that operations performed by the common profile component 1310 do not overlap with those performed by the specific profile component 1320.

As described previously, the communication apparatus 100 may support, for example, the Modbus protocol and the IEC 60870-5-103 protocol.

Figure 3:
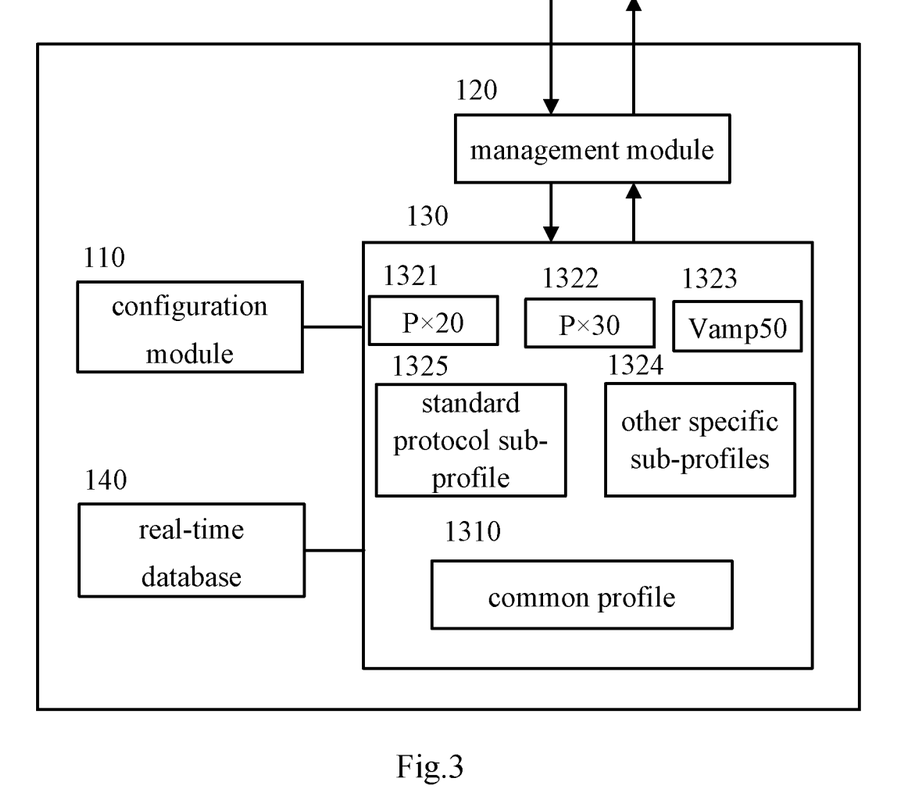
FIG. 3 illustrates an exemplary block diagram of the communication apparatus according to the embodiments of the present disclosure when at least one of a Modbus protocol and an ICE 60870-5-103 protocol is supported.

FIG. 3 illustrates an exemplary block diagram of the communication apparatus 100 according to the embodiments of the present disclosure when at least one of a Modbus protocol and an ICE 60870-5-103 protocol is supported.

As illustrated in FIG. 3, the communication apparatus 100 according to the embodiments of the present disclosure may comprise the configuration module 110, the management module 120, the communication function module 130 and a real-time database 140.

The configuration module 110 may further configure at least one measurement parameter to be read from an external detection apparatus in real-time, besides the operations described previously by referring to FIG. 1.

The real-time database 140 is configured to read measurands of the at least one measurement parameter from the external detection apparatus in real-time and store the read measurands accordingly. The at least one measurement parameter is specified by the configuration parameter in the configuration module 110. Further, the configuration parameter in the configuration module 110 may also specify a read interval at which the measurands of the at least one measurement parameter is read from the external detection apparatus.

As illustrated in FIG. 3, the specific profile component 1320 comprises the Px20 sub-profile component 1321, the Px30 sub-profile component 1322, the Vamp 50 sub-profile component 1323 and other specific sub-profile components 1324.

Furthermore, the specific profile component 1320 may further comprise a standard protocol sub-profile component (native sub-profile component) 1325 for performing operations dedicated in the communication protocol but not defined in the common profile component. Herein, the Px20 sub-profile component 1321, the Px30 sub-profile component 1322, the Vamp 50 sub-profile component 1323, the other specific sub-profile component 1324 and the native sub-profile component 1325 may be referred to as the at least two specific sub-profile components commonly; or only the Px20 sub-profile component 1321, the Px30 sub-profile component 1322, the Vamp 50 sub-profile component 1323 and the other specific sub-profile component 1324 are referred to as the at least two specific sub-profile components commonly.

The respective profile components or sub-profile components in the communication function module 130 are managed by the management module 120, and the management module 120 would select the respective profile component(s) or sub-profile component(s) in the communication function module 130 according to the configuration of the configuration module 110.

Assuming that the communication apparatus according to the embodiments of the present disclosure is configured as the MiCom Px20 currently, if it is required to be switched to the Vamp 50, only the configuration of the configuration module is needed to be changed and the communication apparatus is only needed to be restarted.

For the Modbus communication protocol, the common profile component 1310 performs the operations dedicated in the Modbus communication protocol and common to the plurality of dedicated communication profile components.

For example, the common profile component 1310 may perform at least one of following operations:
  For providing a status value of the communication apparatus to a client when the client polls the status value of the communication apparatus periodically;
  For providing the measurands of the at least one measurement parameter to the client;
  For receiving a control command controlling an ON/OFF state of an external switch from the client, and performing respective operations based on the control command to control the ON/OFF state of the external switch; and
  For providing diagnosis information, as an example, for acquiring a statistics of massages received from the client in order to, for example, determine how many messages are received, and/or how many of them are invalid.

For the Modbus communication protocol, each of the specific profile component 1320 (namely, including the native sub-profile component 1325, the Px20 sub-profile component 1321, the Px30 sub-profile component 1322, the Vamp 50 sub-profile component 1323 and the other specific sub-profile component 1324) may be configured to perform at least one the following operations:
  For providing a self description of the communication apparatus to the client when the client polls the self description of the communication apparatus;
  For receiving a time synchronization command from the client and performing respective operations based on the time synchronization command to perform a time synchronization;
  For reporting operational states to the client, as an example, one or more status values of the apparatus may be reported to the client;
  For providing fault record information to the client, for example, the fault record information may comprise measurands of a plurality of measurement points as the fault occurs;
  For providing a status value change event information to the client; and
  For supporting uploading and downloading of files, providing the operational information of the apparatus in a form of file to the client, for example, the files to be provided may comprise a disturbance recode file, a configuration file, a log file or the fault recode file and the like.

It should be understood that, although some operations which can be performed by the common profile component 1310 and the respective specific sub-profile components are listed herein, the present disclosure is not limited thereto, and those skilled in the art may extract other functions to be performed by the common profile component 1310 depending on the actual application. Further, when the functions of the communication apparatus 100 are desired to be extended, for example when the communication apparatus 100 is desired to be capable of supporting another dedicated communication profile component of the Modbus communication protocol, a new dedicated sub-profile component (132x) corresponding to the dedicated communication profile component may be configured on a basis of the common profile component 1310 according to functionalities and features of the another dedicated communication profile component. The another dedicated communication profile component may be another existing dedicated communication profile component supporting the Modbus communication protocol, or also may be any other dedicated communication profile component developed in future supporting the Modbus communication protocol.

For the Modbus communication protocol, the native sub-profile component 1325 performs standard (native) operations dedicated according to the Modbus communication protocol but not defined in the common profile component 1310.

Figure 4:
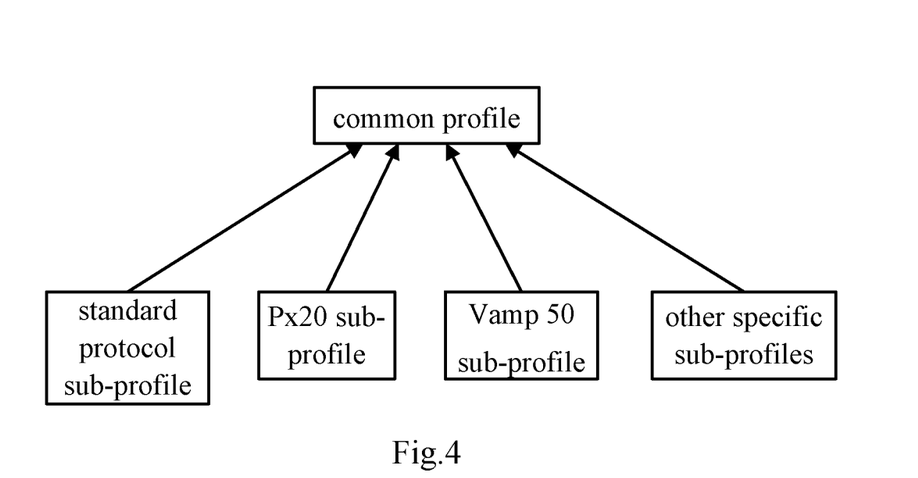
FIG. 4 illustrates a relationship graph of respective sub-profile components inside the communication function module in the communication apparatus according to the embodiments of the present disclosure.

FIG. 4 illustrates a relationship graph of the respective sub-profile components inside the communication function module 130 in the communication apparatus 100 according to the embodiments of the present disclosure.

According to the embodiments of the present disclosure, the communication apparatus may be implemented with a C/C++ software development tool. In this case, the specific profile component 1320 (namely, including the native sub-profile component 1325, the Px20 sub-profile component 1321, the Px30 sub-profile component 1322, the Vamp 50 sub-profile component 1323 and the other specific sub-profile component 1324) may be inherited from the common profile component 1310. Several virtual function APIs may be declared in the common profile component 1310, but their detailed definitions may not be made. These APIs would be defined in detail in all of the inheriting profile components.

Each of the inherited specific sub-profile components may implement specific functions of the corresponding dedicated communication profile component. Further, if a new specific sub-profile component is desired to be added, it may be easily achieved by adding one inheriting profile component.

For the IEC 60870-5-103 communication protocol, the operations performed by the common profile component 1310 and the specific profile component 1320 may be defined similarly to those in the Modbus communication protocol. The common profile component 1310 may perform the operations dedicated in the IEC 60870-5-103 communication protocol and common to a plurality of dedicated communication profile components.

For example, the common profile component 1310 may perform at least one of following operations:

For providing self description information of the communication apparatus to the client when the client polls the self description information of the communication apparatus;

For receiving a control command for extracting waveform data from the client and extracting the waveform data based on the control command;

For reporting time-tagged measurands with relative time;

For receiving a time synchronization command from the client and performing respective operations based on the time synchronization command to perform a time synchronization;

For receiving a setting of test mode from the client, and setting test mode; and For receiving a test command from the client and performing corresponding operations.

For the IEC 60870-5-103 communication protocol, each of the specific profile components 1320 (namely, including the native sub-profile component 1325, the Px20 sub-profile component 1321, the Px30 sub-profile component 1322, the Vamp 50 sub-profile component 1323 and the other specific sub-profile component 1324) may be configured to perform at least one the following operations:

For providing a status value of the communication apparatus to the client;

For providing a fault record information to the client, for example, the fault record information may comprise measurands of a plurality of measurement points as the fault occurs;

For providing a status value change event information to the client;

For receiving a control command controlling an ON/OFF state of an external switch from the client, and performing respective operations based on the control command to control the ON/OFF state of the external switch;

For supporting uploading and downloading of files, providing operational information of the communication apparatus in a form of file to the client, for example, the files to be provided may comprise a disturbance recode file, a configuration file, a log file or the fault recode file and the like; and For receiving a data general interrogation command for reading all data in the real-time database from the client and performing corresponding operations, in order to read out all data in the real-time database and provide the read data to the client, for example, the client may issue the data general interrogation command to read out all data in the real-time database when the communication is established initially.

It should be understood that, although some operations which can be performed by the common profile component 1310 and the respective specific sub-profile components are illustrated herein, the present disclosure is not limited thereto, and those skilled in the art may extract other functions to be performed by the common profile component 1310 depending on the actual application. Further, when the functions of the communication apparatus 100 are desired to be extended, for example when the communication apparatus 100 is desired to be capable of supporting another dedicated communication profile component of the IEC 60870-5-103 communication protocol, a dedicated sub-profile component (132x) corresponding to the another dedicated communication profile component may be configured on a basis of the common profile component 1310 according to functionalities and features of the another dedicated communication profile component. The another dedicated communication profile component may be another existing dedicated communication profile component supporting the IEC 60870-5-103 communication protocol, or may also be any other dedicated communication profile component developed in future supporting the IEC 60870-5-103 communication protocol.

For the IEC 60870-5-103 communication protocol, the native sub-profile component 1325 performs standard (native) operations dedicated according to the IEC 60870-5-103 communication protocol but not defined in the common profile component 1310.

Figure 5:
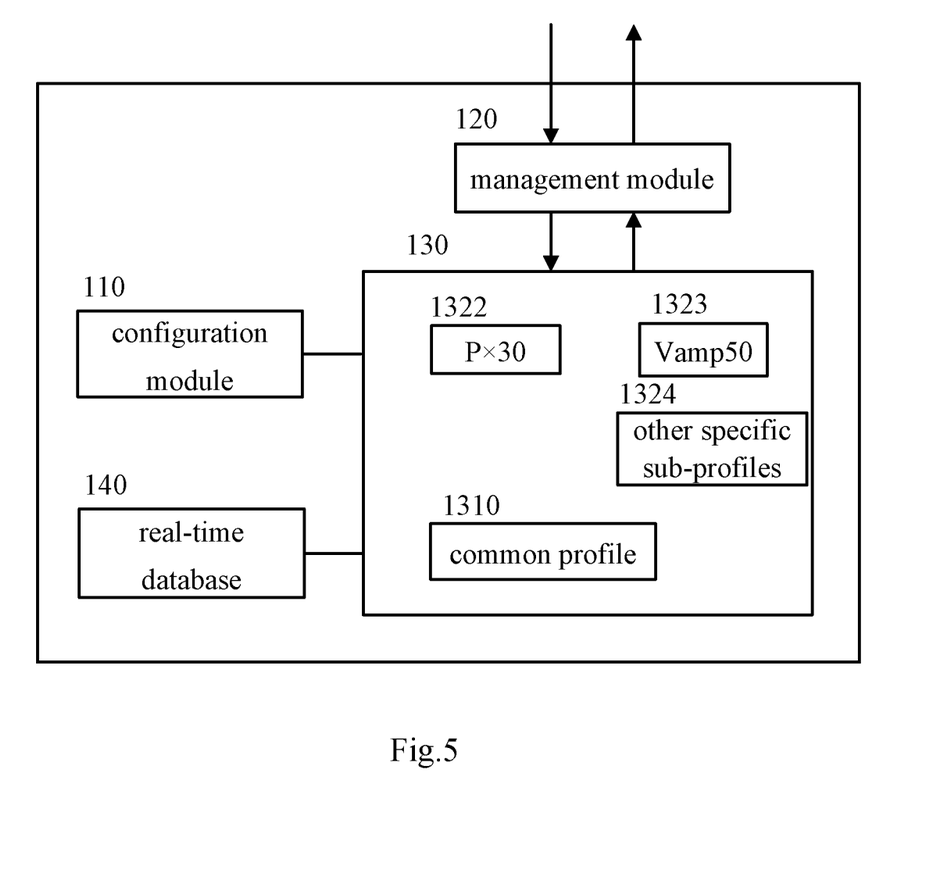
FIG. 5 illustrates an exemplary block diagram of the communication apparatus according to the embodiments of the present disclosure when a DNP3 protocol is supported.

FIG. 5 illustrates an exemplary block diagram of the communication apparatus 100 according to the embodiments of the present disclosure when a DNP3 protocol is supported.

As illustrated in FIG. 5, the communication apparatus 100 according to the embodiments of the present disclosure may comprise the configuration module 110, the management module 120, the communication function module 130 and the real-time database 140.

It is known that the DNP3 communication protocol has many versions and revisions, normally the newer version and revision only add some new functionalities or features without changing original functionalities or features. Therefore, the latest version of the DNP3 communication protocol can cover all functionalities defined in old versions.

Based on the above conception, for the DNP3 communication protocol, the communication apparatus 100 may comprise the common profile component 1310 and the specific profile component 1320.

The common profile component 1310 may be configured to perform standard (native) operations defined according to the oldest version of the communication protocol. Herein, the common profile component 1310 may be embodied as a basic protocol profile component.

The specific profile component 1320 may comprise one or more specific profile components in which operations for performing other functions added on a basis of the oldest version of the communication protocol are collected.

As illustrated in FIG. 5, for example, by taking a case in which the version of the DNP3 communication protocol supported by the Px20 communication profile component is the oldest version as an example, the common profile component 1310 may provide all functions supported by the Px20 communication profile component.

In a case that the specific profile component 1320 only comprises one specific profile component, the specific profile component 1320 may provide all functions supported by communication profile components other than the Px20 communication profile component.

Alternatively, the specific profile component 1320 may also comprise at least two specific sub-profile components, for example, the Px30 sub-profile component, the Sepam 20 sub-profile component and the Vamp 50 sub-profile component, and each of the specific sub-profile components is configured to perform operations of the functions added in each new version.

According to the embodiments of the present disclosure, the communication apparatus may be implemented with a C/C++ software development tool. In this case, the specific profile component 1320 (namely, including the Px30 sub-profile component 1322, the Vamp 50 sub-profile component 1323 and the other specific sub-profile component 1324) can be inherited from the common profile component 1310.

According to the embodiments of the present disclosure, for the various dedicated communication profile components supporting the same communication protocol, the functionalities and features of the various dedicated communication profile components are divided into the common functions and the specific functions, and accordingly the common profile component is configured to perform the common functions while the specific profile component is configured to perform the specific functions, therefore the functions of the various dedicated communication profile components are integrated into one communication apparatus with small code overload. Furthermore, the communication apparatus can be configured to operate as one of the various dedicated communication profile components by configuration. Thus, a versatility of the communication apparatus is enhanced.

Further, the communication apparatus according to the embodiments of the present disclosure can be applied to a relay protection apparatus.

From the above description of embodiments, those skilled in the art can clearly understand that the present disclosure can be implemented in a manner of software with necessary hardware platform(s), and of course may be implemented with software completely or hardware completely. Based on such understanding, all or a part of solutions of the present disclosure, which contribute to the prior art may be embodied with a form of computer software products, and the computer software products may be stored in a storage medium such as a ROM/RAM, a magnetic disk, an optical disk, etc, and comprise several instructions for causing a computer device (may be a personal computer, a server or a network device and the like) to perform methods described in the respective embodiments and a part of one embodiment of the present disclosure.

The various embodiments of the disclosure have been described in detail, but it will be obvious to those skilled in the art that many variations, combinations and sub-combinations can be made to these embodiments without departing from the spirit and scope of the disclosure, and all such modifications fall into the scope of the present invention.

What is claimed is:

1. A communication apparatus configured to support at least one of communication protocols and to provide functions of at least two dedicated communication profile components for each communication protocol, wherein the communication apparatus comprises:

a configuration module configured to set an operational parameter of the communication apparatus, the operational parameter indicating that which one of the at least two dedicated communication profile components is used for the communication apparatus; and a memory, comprising instructions for causing the communication apparatus to provide functions of the at least two dedicated communication profile components and to operate as the one of the at least two dedicated communication profile components according to configuration of the configuration module;

wherein, for each of the communication protocols. the memory further comprises:

a common profile component with operations common to the at least two dedicated communication profile components; and a specific profile component configured to perform operations dedicated to each of the at least two dedicated communication profile components respectively, wherein, the specific profile component further comprises at least two specific sub-profile components each for performing the dedicated operations of each of the at least two dedicated communication profile components respectively, wherein the instructions, when being executed, cause the communication apparatus to operate a function of the one of the at least two dedicated communication profile components by selecting the function provided by the specific profile component according to the configuration of the configuration module, and wherein, for each of the communication protocols, the at least two dedicated communication profile components comprise at least two of a MiCom Px20 communication profile component, a MiCom Px30 communication profile component, a MiCom Px40 communication profile component, a Sepam 20/40/80 communication profile component and a Vamp 50 communication profile component.

2. The communication apparatus of claim 1, wherein the at least one communication protocol comprises at least one of a Modbus protocol, a DNP3 protocol and an ICE60870-5-103 protocol.

3. The communication apparatus of claim 2, wherein, for the Modbus protocol, when the common profile component is selected, the communication apparatus performs at least one of following operations:

providing a status value of the communication apparatus to a client;
providing measurands to the client;
controlling an ON/OFF state of an external switch; and
providing diagnosis information.

4. The communication apparatus of claim 3, wherein when at least one of the at least two specific sub-profile components is selected, the communication apparatus performs at least one of the following operations:
providing a self description of the communication apparatus to the client;
receiving a time synchronization command from the client and performing respective operations;
reporting abnormal state information of the apparatus to the client;
providing fault record information to the client; providing status value change event information to the client; and supporting uploading and downloading of files.

5. The communication apparatus of claim 2, wherein, for the IEC60870-5-103 protocol, when the common profile, component is selected, the communication apparatus performs at least one of following operations:
providing a self description of the communication apparatus to a client;
extracting waveform data; reporting time-tagged measurands with relative time;
performing a time synchronization operation;
setting a test mode; and
receiving a test command from the client and performing corresponding operations.

6. The communication apparatus of claim 5, wherein when at least one of the at least two specific sub-profile components is selected, the communication apparatus performs at least one of the following operations:
providing a status value of the communication apparatus to the client;
providing fault record information to the client; providing status value, change event information to the client;
controlling a ON/OFF state of an external switch;
supporting uploading and downloading of tiles; and
receiving a data general interrogation command for reading all data in a real-time database and performing corresponding operations.

7. The communication apparatus of claim 1, wherein, for each of the communication protocols, the at least two specific sub-profile components comprise at least two of a MiCom Px20 sub-profile component, a MiCom Px30 sub-profile component, a MiCom Px40 sub-profile component, a Sepam 20/40/80 sub-profile component and a Vamp 50 sub-profile component.

8. The communication apparatus of claim 7, wherein, for at least one of a Modbus protocol and an IEC 60870-5-103 protocol, the at least two specific sub-profile components further comprise a standard protocol sub-profile component, wherein when the standard protocol sub-profile component is selected, the communication apparatus performs operations specified by the one of the Modbus protocol and the IEC 60870-5-103 protocol but not defined in the common profile component.

9. A relay protection apparatus comprising the communication apparatus of claim 1.

10. The relay protection apparatus of claim 9, wherein the at least one communication protocol comprises at least one of a Modbus protocol, a DNP3 protocol and an ICE60870-5-103 protocol.

11. The relay protection apparatus of claim 10, wherein, for the Modbus protocol, when the common profile component is selected, the communication apparatus performs at least one of following operations:
providing, a status value of the communication apparatus to a client;
providing measurands to the client;
controlling an ON/OFF state of an external switch; and
providing diagnosis information.

12. The relay protection apparatus of claim 11, wherein when at least one of the at least two specific sub-profile components is selected, the communication apparatus performs at least one of the following operations:
providing a self description of the communication apparatus to the client;
receiving a time synchronization command from the client and performing respective operations;
reporting abnormal state information of the apparatus to the client;
providing fault record information to the client:
providing status value change event information to the client; and
supporting uploading and downloading of files.

13. The relay protection apparatus of claim 10, wherein, for the IEC 6087Q-5-103 protocol, when the common profile component is selected, the communication apparatus performs at least one of following operations:
providing a self description of the communication apparatus to a client;
extracting waveform data; reporting time-tagged measurands with relative, time;
performing a time synchronization operation;
setting a test mode; and
receiving a test command from the client and performing corresponding operations.

14. The relay protection apparatus of claim 13, wherein when at least one of the at least two specific sub-profile components is selected, the communication apparatus performs at least one of the following operations:
providing a status value of the communication apparatus to the client;
providing fault record information to the client;
providing status value change event information to the client;
controlling a ON/OFF state of an external switch;
supporting uploading and downloading of files; and
receiving a data general interrogation command for reading all data in a real-time database and performing corresponding operations.

15. A communication apparatus configured to support at least one of communication protocols and to provide functions of at least two dedicated communication profile components for each communication protocol, wherein the communication apparatus comprises:
a memory, comprising instructions, when executed, cause the communication apparatus to perform at least of the steps:
setting an operational parameter of the communication apparatus, the operational parameter indicating that which one of the at least two dedicated communication profile components is used for the communication apparatus; and
operating as the one of the at least two dedicated communication profile components according to the set operational parameter,
wherein the memory comprises a common profile component with operations common to the at least two dedicated communication profile components and at least two specific sub-profile components with operations dedicated to the at least two dedicated communication profile components respectively, wherein the instructions, when executed, cause the communication apparatus to operate a function of the one of the at least two dedicated communication profile components by selecting the function provided by the at least two specific sub-profile components according to the set operational parameter, and wherein, for each of the communication protocols, the at least two dedicated. communication profile components comprise at least two of a MiCom Px20 communication. profile component, a MiCom Px30 communication profile component, a MiCom Px40 communication profile component, a Sepam 20/40/80 communication profile component and a Vamp 50 communication profile component.

* * * * *